United States Patent
Kachelhoffer

(10) Patent No.: US 12,501,520 B2
(45) Date of Patent: Dec. 16, 2025

(54) PTC HEATING ASSEMBLY

(71) Applicant: Eberspächer catem GmbH & Co. KG, Herxheim (DE)

(72) Inventor: Patrick Kachelhoffer, Seebach (FR)

(73) Assignee: Eberspächer catem GmbH & Co. KG, Herxheim (DE)

( * ) Notice: Subject to any disclaimer, the term of this patent is extended or adjusted under 35 U.S.C. 154(b) by 910 days.

(21) Appl. No.: 17/721,511

(22) Filed: Apr. 15, 2022

(65) Prior Publication Data

US 2022/0338306 A1 Oct. 20, 2022

(30) Foreign Application Priority Data

Apr. 16, 2021 (DE) .................. 10 2021 109 618.9

(51) Int. Cl.
 *H05B 3/24* (2006.01)
 *H05B 3/18* (2006.01)
 *H05B 3/44* (2006.01)

(52) U.S. Cl.
 CPC .......... *H05B 3/24* (2013.01); *H05B 3/18* (2013.01); *H05B 3/44* (2013.01); *H05B 2203/016* (2013.01); *H05B 2203/02* (2013.01)

(58) Field of Classification Search
 CPC ... H05B 3/24; H05B 3/18; H05B 3/44; H05B 2203/016; H05B 2203/02
 See application file for complete search history.

(56) References Cited

U.S. PATENT DOCUMENTS

| 5,268,665 | A | 12/1993 | Iwao |
| 2017/0303341 | A1 | 10/2017 | Maher et al. |
| 2018/0310365 | A1 | 10/2018 | Kohl et al. |
| 2019/0084374 | A1* | 3/2019 | Min .............. F24H 9/1872 |
| 2020/0171920 | A1* | 6/2020 | Walz .............. B60H 1/2225 |
| 2020/0275529 | A1* | 8/2020 | Walz .............. F24H 9/1872 |
| 2021/0247105 | A1* | 8/2021 | Salahub .............. H05B 3/26 |

FOREIGN PATENT DOCUMENTS

| DE | 20 2011 003 209 U | 5/2012 |
| DE | 10 2019 204 472 A1 | 10/2020 |
| EP | 0 899 985 | 3/1999 |
| EP | 1452357 | 9/2004 |
| EP | 1 564 503 A1 | 8/2005 |
| EP | 3334242 | 6/2018 |
| EP | 3410818 | 12/2018 |
| EP | 3 731 595 | 10/2020 |
| JP | 2014222781 | 11/2014 |

* cited by examiner

*Primary Examiner* — Elizabeth M Kerr
*Assistant Examiner* — Keith Brian Assante
(74) *Attorney, Agent, or Firm* — Boyle Fredrickson, S.C.

(57) ABSTRACT

A PTC heating assembly has a plurality of PTC elements and electric strip conductors between which the PTC elements are provided and which are electrically conductively connected to the PTC elements The PTC heating assembly also includes a frame which forms at least one receptacle for the PTC elements and which is provided between the strip conductors. For adjusting the heating power of the PTC heating assembly, at least two strip conductors on at least one side of the PTC elements are electrically conductively connected to PTC elements which deviate from one another.

6 Claims, 6 Drawing Sheets

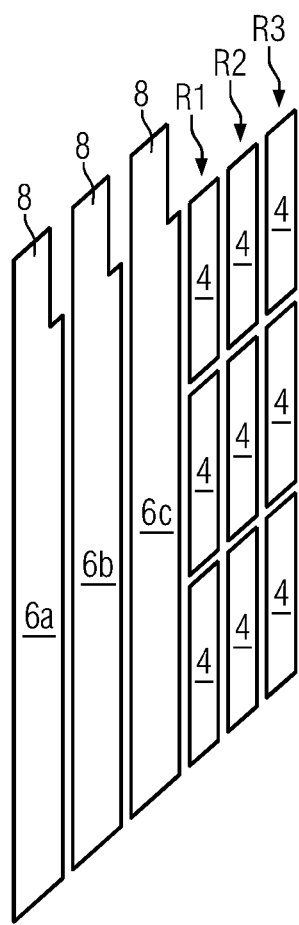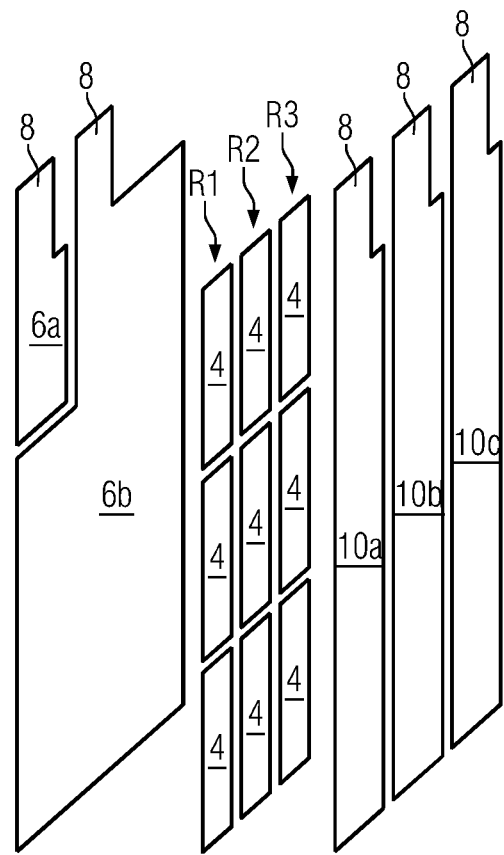
FIG. 3C                    FIG. 3D

PTC HEATING ASSEMBLY

BACKGROUND OF THE INVENTION

1. Field of the Invention

The present invention relates to a PTC heating assembly with a plurality of PTC elements and with electric strip conductors between which the plurality of PTC elements are provided. The PTC elements are electrically conductively connected to the strip conductors so that the PTC elements can be energized with different polarity.

2. Background of the Invention

The PTC heating assembly also has a frame which receives the PTC elements. For this purpose, this frame has at least one receptacle. The frame is usually provided between the electric strip conductors.

For example, a generic PTC heating assembly is disclosed in DE 10 2019 204 472 A1. In this prior art, several PTC heating assemblies of the aforementioned type are used in a water heater comprising heating ribs protruding into a heating chamber and each receiving the PTC heating assembly or several such PTC heating assemblies. However, generic PTC heating assemblies are also used in an air heater. An example of this is given by EP 1 564 503 A1. In this prior art, the PTC elements are normally provided one behind the other in receptacles of the frame.

In particular, the present invention aims to provide a PTC heating assembly of the aforementioned type that is configured to be used, for example, in an electric heating device in a motor vehicle. In this context, the previous solutions usually disclose a connection chamber provided opposite the heating chamber, in which contact tongues electrically connected to electric strip conductors of the PTC heating assemblies are exposed. Thus, the PTC heating assemblies are usually connected in the connection chamber. The connection chamber can also house a control device that drives and controls different PTC heating assemblies of the heating device (see, for example, DE 20 2011 003 209 U1 or EP 3 731 595 A1).

In this process, control is performed for each PTC heating assembly. A single PTC heating assembly with several PTC elements can be controlled uniformly. For adjustment of the desired heating power, several of the PTC heating assemblies of a heating device are usually combined in a heating circuit, which can be switched off or on and the heating power of which can usually be controlled via power transistors, so that the actual heating power of the heating device can be adjusted in each case via the control device.

Nevertheless, there is a need for further, possibly more differentiated, adjustment of the heating power.

The underlying problem of the present invention is to provide a PTC heating assembly of the type introductorily mentioned, the heating power of which can be adjusted in a more differentiated manner.

SUMMARY

In order to solve this problem, the present invention proposes the provision of PTC heating assembly comprising a plurality of PTC elements, electric strip conductors between which the PTC elements are provided and which are electrically conductively connected to the PTC elements, and a frame forming at least one receptacle for the PTC elements and being provided between the strip conductors. At least two strip conductors are provided on at least one side of the PTC elements, which are in electrically conductive contact with PTC elements deviating from one another.

Thus, within the PTC heating assembly, different strip conductors are assigned to the PTC elements provided in the frame, each of which energizes only a part of the total number of PTC elements provided in the PTC heating assembly through adapted energization.

The PTC elements are held in a positioning frame. This positioning frame has receptacles which are adapted to the size of the at least one PTC element located in the receptacle. In a manner known, several PTC elements can also be provided in a single receptacle. The PTC element(s) provided in the receptacle are positioned via the positioning frame. In a corresponding manner, the at least two strip conductors provided on one side of the PTC element are also held in a predetermined position. By interacting with the position frame, correspondingly selected PTC elements can be locally assigned to specific strip conductors via which these PTC elements are contacted on one side and accordingly energized.

One side can be the plus side or the minus side or assigned to a ground pole. On the opposite side, a uniform strip conductor is usually provided, which is assigned to all PTC elements. However, also on this side there can be a further locally broken down contacting of the PTC elements.

In the following description, it is assumed that the PTC elements are cuboid-shaped, with a relatively low height, so that opposite main side surfaces of the PTC elements have a significantly larger surface than the surface sections of the circumferential edge. The surface of the main side sections is usually larger by a factor of 5 than the largest surface segment of the cuboid contained in the circumferential edge. The description in this respect serves to clarify the invention. Of course, the invention can also be implemented with an end-side energization of the PTC elements. With such an energization, the strip conductors abut against the circumferential edge, so that the heat extraction from the PTC element via the main side surface does not have to take place through the strip conductor.

In a simple configuration, in which the switching of various PTC elements of a single PTC heating assembly takes place only via the corresponding contacting on one side, a single strip conductor is accordingly provided on the opposite side, which electrically connects all PTC elements. Insofar as a differently configured electrical connection of the PTC elements is also selected on the opposite side, the heating power of the PTC system can occasionally be fine-tuned with a simpler structure. According to a preferred further development of the present invention, it is proposed for this purpose that a plurality of strip conductors are provided on one side of the PTC elements and a plurality of opposing strip conductors are provided on the opposite side. The strip conductors and the opposite strip conductors are each assigned to a plurality of PTC elements. The strip conductor provided on one side is electrically conductively connected to at least a plurality of PTC elements, which are electrically conductively connected to different opposite strip conductors on the opposite side.

Particularly where space is limited, several electric strip conductors on one of the two sides may cover a single PTC element, but only one of these several strip conductors is to serve to energize the corresponding PTC element. In such a case, the other strip conductor leads to another PTC element and is accordingly not assigned to the one PTC element. Such coverage can also result from inaccurate positioning during assembly or changes in the position of the strip conductors during operation. The PTC heating assembly of the present invention is used in particular in motor vehicles which are subjected to considerable vibrations. In this respect, it can also be useful to provide one or more electric strip conductors opposite at least one of the PTC elements with an insulation which prevents electrical contact between the said strip conductor and the predetermined PTC element, but which is not formed opposite another PTC element, so that the strip conductor is electrically conductively connected there to this PTC element.

Depending on the selected power current for energizing the PTC elements, an insulating layer can be provided on one side of the electric strip conductors opposite the PTC elements, covering this opposite side. Usually, the two outer sides of the PTC heating assembly are covered on the outside with such an electric insulating layer. These insulating layers can be connected to the frame. For example, they can be bonded to the frame. It is also possible to overmold the frame and the insulating layers on the outside with a plastic material to form a frame-shaped housing which encloses the frame and the PTC elements as well as the strip conductors and basically covers the insulating layers on the outside only at the edge, so that the insulating layers at least partially also form the outer surface of the PTC heating assembly, in particular opposite the main side surfaces of the PTC elements, which dissipate the predominant part of the heat generated by the PTC elements to the outside. In this respect, reference can be made to EP 3 334 242 A1. The PTC heating assembly according to the invention can also be realized in principle with the configuration described there.

BRIEF DESCRIPTION OF THE DRAWINGS

Further details and advantages of the present invention will be apparent from the following description of an embodiment in conjunction with the drawing.

FIG. 3A-3D show different variants for strip conductors provided on one side;

DETAILED DESCRIPTION

Figures 1, 2:
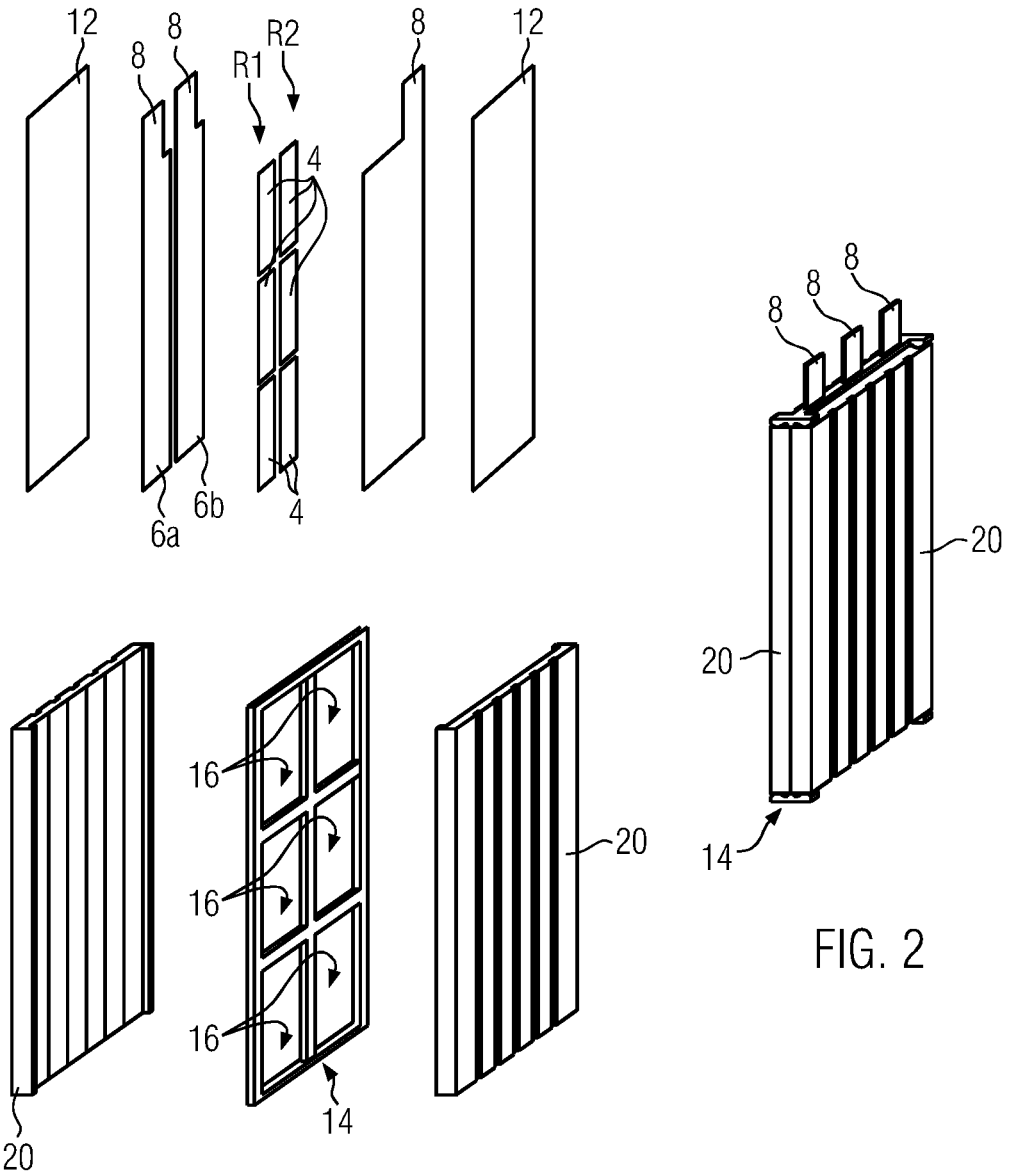
FIG. 1 shows a perspective exploded view of a first embodiment.
FIG. 2 shows the embodiment shown in FIG. 1 in the assembled state.

In FIG. 1, reference sign 2 identifies a PTC heating assembly with several, in this case six, PTC elements 4. Two first strip conductors 6a, 6b are provided on the left-hand side of the PTC elements 4 in FIG. 1. The strip conductors consist of stamped sheet metal strips and have contact tongues 8 at one free end. On the opposite side of the PTC elements 4, there is only one uniform strip conductor 10. This strip conductor 10 covers the main side surfaces of all PTC elements 4.

The PTC elements 4 are arranged in two adjacent rows R1, R2. Each of the rows R1 and R2 comprises three PTC elements 4.

The elongated strip conductor 6a covers the PTC elements 4 of the first row R1. The other strip conductor 6b covers the other row R2. The opposite strip conductor 10 covers all PTC elements 4. All strip conductors 6a, 6b, 10 are directly electrically connected to the main side surfaces of the PTC elements 4. The PTC elements 4 are ceramic components which are provided with an electrode layer on their main side surfaces for electrical contact, which is applied by vapor deposition, for example. On the side opposite the PTC elements 4, the strip conductors 6a, 6b are each covered with an insulating layer 12, in this case in the form of a ceramic plate.

Below this layered structure, a frame identified by reference sign 14 can be seen in FIG. 1. This frame 14 has several receptacles 16, each of which is adapted to receive one of the PTC elements 4. In the embodiment shown, the receptacles 16 each have the same size. PTC elements 4 with identical dimensions are installed.

The PTC elements 4 are located in the receptacles 16 and within the plane of the frame 14. The PTC elements 4 are thicker than the frame 14, so that the strip conductors 6a, 6b, 10 accommodate the frame 14 between them, while electrically conductively abutting directly against the PTC elements 4. The insulating layers 12 are each applied directly against the outside of the strip conductors 6a, 6b or 10.

Figures 3A, 3B:
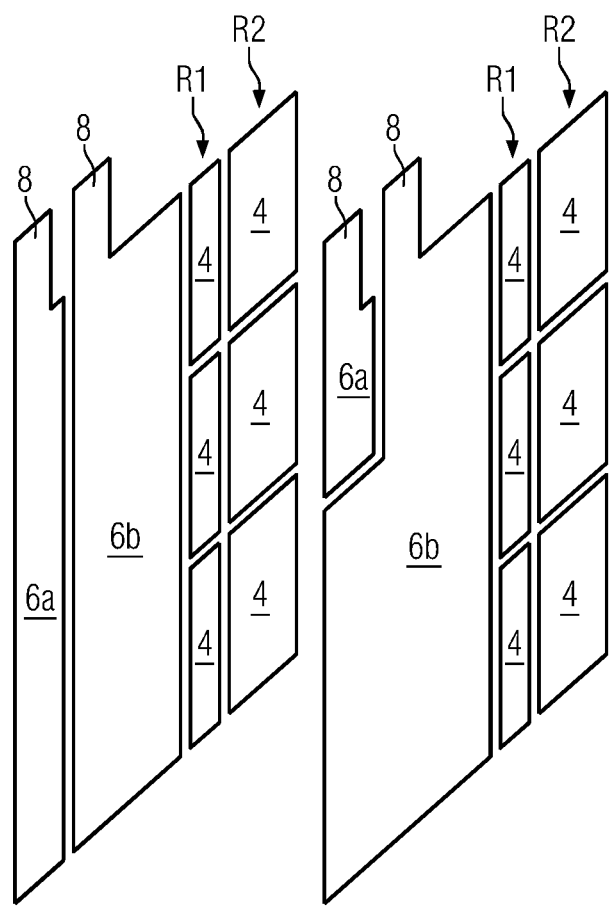

FIG. 3A shows a first variation on the embodiment shown in FIGS. 1 and 2. There, too, two rows R1, R2 are realized, each with three PTC elements 4 provided one above the other. However, the PTC elements 4 are of different sizes. The PTC elements of the first row R1 are smaller than the PTC elements of the second row R2. The same applies to the footprint of the two strip conductors 6a, 6b.

Whereas in the embodiment according to FIGS. 1 and 2, an identical heating power could be switched on by switching the strip conductors 6a and 6b on and off respectively, in the embodiment according to FIG. 3A, the heating power can additionally be controlled depending on which of the two strip conductors 6a, 6b is switched on or controlled.

In the embodiment according to FIG. 3B, the strip conductor identified by reference sign 6a covers only one PTC element 4 on one side. The other PTC elements 4 are assigned to the heating circuit that can be controlled via the contact tongue 8 of the strip conductor 6b.

In the embodiment shown in FIG. 3C, three strip conductors 6a, 6b, 6c are provided on one side, each of which is assigned to three PTC elements 4 arranged one above the other.

Another variant is conceivable and is shown in FIG. 3D. There, three strip conductors 10a to 10c are provided on the opposite side, which cover the PTC elements provided in a row R1, R2, R3 respectively and are electrically conductive thereon. The strip conductors 6a, 6b provided on one side correspond to the embodiment shown in FIG. 3B.

Except for the PTC element 4 shown at the upper left in FIG. 3D, all other PTC elements 4 are electrically connected to strip conductor 6b on one side. On the opposite side, the strip conductors of the first row R1 are connected to the opposite strip conductor 10a. Thus, the PTC elements 4 contained in row R1 are electrically connected to a single strip conductor 10a on the opposite side, but to two strip conductors 6a, 6b on the opposite side. For the PTC elements of the R2 and R3 rows, the situation is exactly the opposite. They are electrically connected to strip conductor 6b on one side and to different strip conductors 10b, 10c on the opposite side.

By selectively controlling the individual strip conductors 6a, 6b, 10a, 10b, 10c, the heating power output by the PTC heating assembly 2 can be adjusted. In doing so, individual heating circuits can be merely switched or also controlled via a power transistor, so that the heating power of individual heating circuits can also basically be controlled from 0 to 100% of the heating power of the respective heating circuits. A heating circuit is formed by those PTC elements 4 which are arranged between two strip conductors 6, 10.

Figure 4:
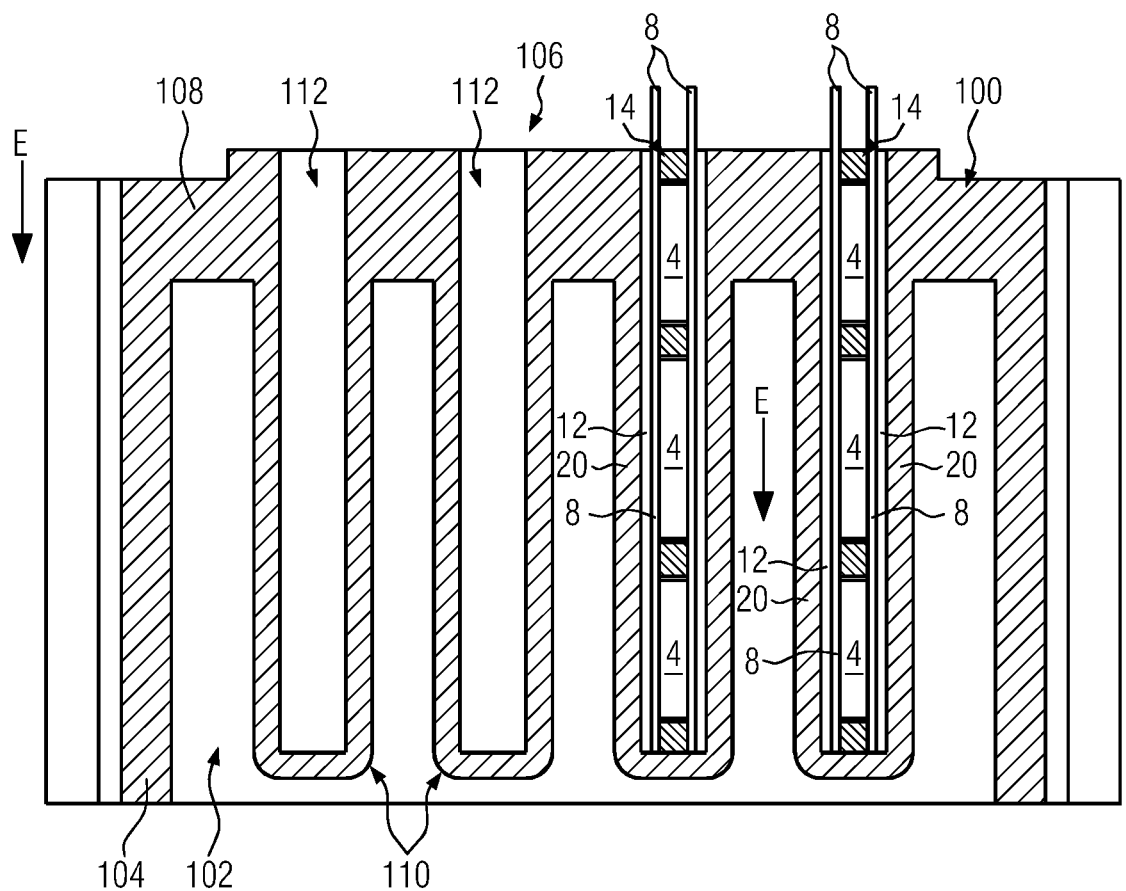
FIG. 4 shows a cross-sectional view of a part of an electric heating device created using a PTC heating assembly according to the invention.

Reference sign 20 in FIG. 1 identifies extruded profile elements which accommodate the layered structure consisting of the insulating layers 12, the strip conductors 6a, 6b, 10 provided within them, the frame 14, and the PTC elements 4. The profile elements 20 are formed from extruded aluminum. The profile elements 20 are received in a heating device, which is identified by reference sign 98 in FIGS. 4 through 6 discussed below. The electric heating device 98 has a housing 100. The housing 100 forms a wall 104 circumferentially surrounding a heating chamber 102. In FIG. 1, the heating chamber 102 is still open on the lower side, since a bottom closing the lower side of the housing 100 is not shown in FIG. 1. The same applies to a control housing cover, which is connected to the housing 100 on the opposite side to cover and surround a connection chamber identified by reference sign 106. Between the heating chamber 102 and the connection chamber 106, the housing 100 integrally forms a partition wall 108. Heating ribs 110 protrude from this partition wall 108 into the heating chamber 102. The heating ribs 110 are closed at their lower end protruding into the heating chamber 102. As illustrated by the hatching in FIG. 4, the heating ribs 110, together with the partition wall 100 and the wall 104, are formed from a one-piece die-cast aluminum housing 100.

The heating ribs 110 form a wedge-shaped downwardly tapering receiving pocket 112. A PTC heating assembly 2 is received in each of the receiving pockets 112.

Figure 5:
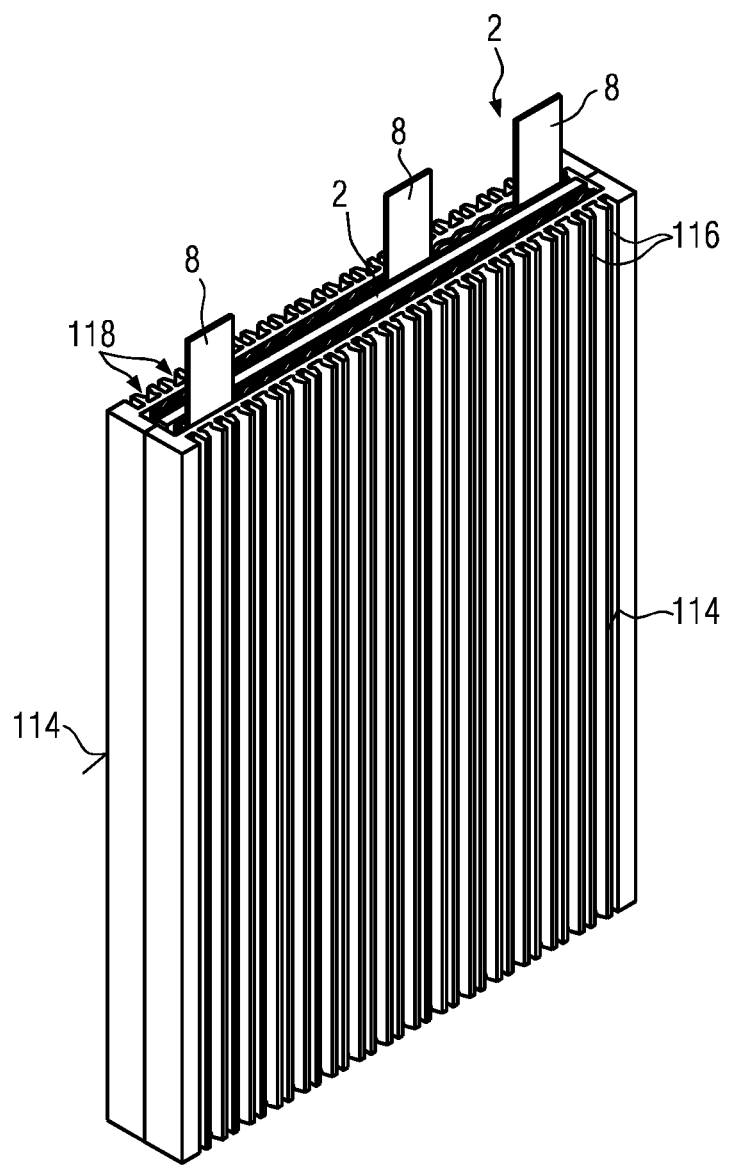
FIG. 5 shows a perspective side view of an embodiment of a PTC heating assembly used in the electric heating device of FIG. 4.
Figure 6:
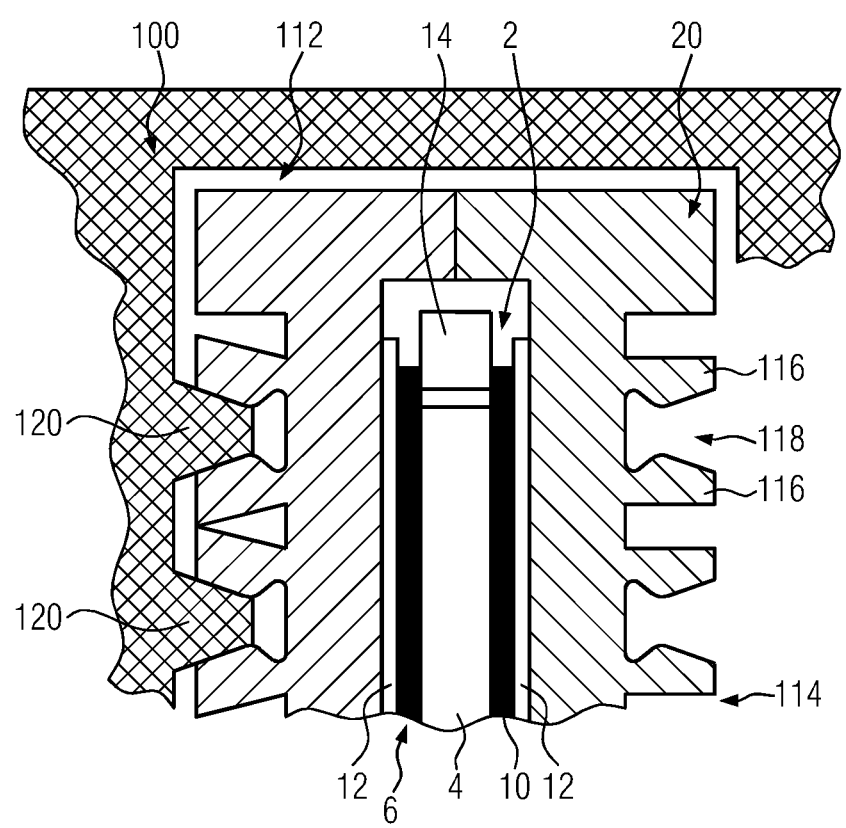
FIG. 6 shows a sectional view along line VI-VI as shown in FIG. 4.

As FIGS. 5 and 6 in particular convey, each of the profile elements 20 is U-shaped in cross-section. Flange surfaces identified by reference sign 114 have outwardly protruding groove limiting projections 116, each of which encloses a groove 118 therebetween in pairs. As illustrated in particular by FIG. 6, the flange surface 114 has a plurality of identically formed grooves 118. The grooves 118 extend in the insertion direction of the receiving pocket 112, which is identified by reference sign E in FIG. 4.

In turn, spring projections 120 extend from the inside of the receiving pocket 112. These spring projections 120 are integrally formed on the die-cast housing 100. As the cross-sectional view according to FIG. 6 conveys, the spring projections 120 taper toward their free end in a wedge shape. In a corresponding manner, the groove limiting projections 116 are also formed to taper in a wedge shape toward their free front end. It is understood that only the surfaces of the groove limiting projections 116 respectively limiting the groove 118 have such a configuration. In order to illustrate this, the spring projections 120 are omitted on the right side in FIG. 6.

During assembly of the embodiment, the PTC heating assembly 2 is first arranged between the profile parts 20. Then the pre-assembled assembly is inserted into the receiving pocket 112. In this process, the spring projections 120 engage in the grooves 118 assigned to them. The result is a deformation in the region of the groove limiting projections 116, which can be seen from the comparison of the right-hand side with the left-hand side according to FIG. 6. This results in a certain tolerance compensation and consequently an elastic deformation of the tongue and groove structure on the flange surfaces 114 of the profile elements 20 and the associated spring projections 120 of the housing 100. The PTC heating assembly 2 is thus arranged in the receiving pocket 112 under pretension and thus with good heat-conducting properties.

Any remaining cavities in the receiving pocket 112 can be filled by a good heat-conducting compound, such as a curing plastic compound filled with heat-conducting particles.

However, the housing can also be formed by an extruded profile which forms a receiving pocket open on both sides, wherein the inner surface of the receiving pocket is formed by a partition wall which forms a heating chamber extending parallel to the receiving pocket which guides the fluid to be heated. Several profiles can be arranged next to each other in this way, so that a parallel flow for the fluid to be heated is guided past various receiving pockets, as is known in principle from EP 0 899 985 A1, for example. In this context, the receiving pocket can be formed between two joined profiles. Thus, the PTC heating assembly together with the profile parts can also be inserted into the extruded profile, each of which is provided with spring projections formed in the manner described above and cooperating with the groove limiting projections of the profile elements to clamp the layers of the PTC heating assembly against each other.

The invention claimed is:

1. A PTC heating assembly comprising:
a plurality of PTC elements;
electric strip conductors between which the PTC elements are provided and which are electrically conductively connected to the PTC elements; and
a frame forming at least one receptacle for the PTC elements, wherein the frame is provided between the strip conductors;
wherein a plurality of the strip conductors are provided on a first side of the PTC elements and a plurality of the strip conductors are provided on a second opposite side of the PTC elements opposite the first side; and
wherein at least one of the strip conductors on the first side of the PTC elements is electrically conductively connected to a plurality of PTC elements which are electrically conductively connected to different opposite strip conductors on the second side of the PTC elements.

2. The PTC heating assembly according to claim 1, wherein a plurality of the strip conductors are provided on a first side of the PTC elements, and a single strip conductor is provided on a second side of the PTC elements opposite the first side.

3. The PTC heating assembly according to claim 2, further comprising electric insulating layers covering the electrical strip conductors on the second side of the PTC elements.

4. The PTC heating assembly according to claim 3, wherein the electric insulating layers are each connected to the frame.

5. The PTC heating assembly according to claim 1, further comprising electric insulating layers covering the electrical strip conductors on the second side of the PTC elements.

6. The PTC heating assembly according to claim 5, wherein the electric insulating layers are each connected to the frame.

* * * * *